8636X
T. I. GODMAN.
APPARATUS FOR SCALDING HOGS BY STEAM.
Patented Feb. 13, 1835.
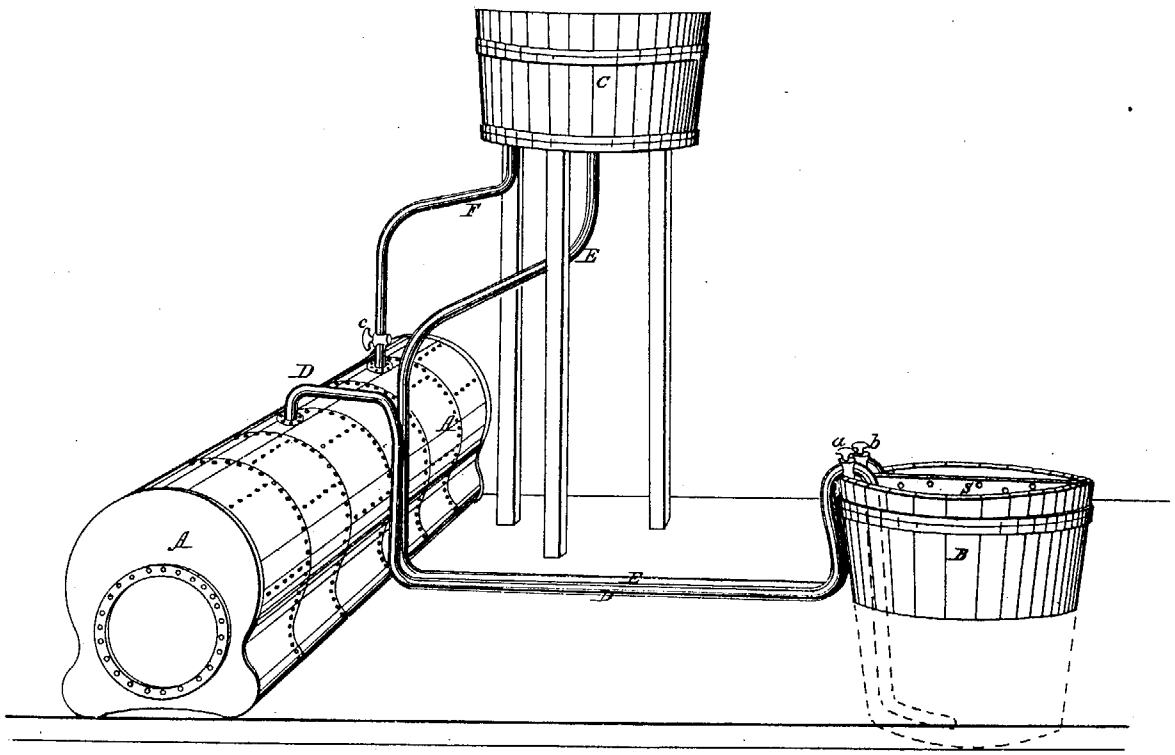
THE NORRIS PETERS CO., PHOTO-LITHO., WASHINGTON, D. C.

Feb. 13, 1835 86364X

Thomas I. Godman, of Baltimore, Md.
Letters Patent

The schedule referred to in these Letters Patent and making part of the same containing a description in the words of the said Thomas I. Godman himself of his improvement in the apparatus for scalding hogs by steam —

---

To all to whom these presents shall come; Be it known that I Thomas I. Godman of the City of Baltimore in the County of Baltimore, and State of Maryland have invented a new and useful improvement in the apparatus for scalding hogs by steam and that the following is a full and exact description of the construction and operation of the said apparatus as invented or improved by me — My apparatus consists in the first place of a boiler A similar to any of those in common use for generating steam and of a capacity sufficient for the business — 2nd a cylindrical wooden tub or vessel B. of 4 to 5 feet deep and 6 to 8 feet diameter is sunk in the ground about half its depth at a convenient distance from the boiler and at one end of the scraping table or platform so as to be convenient thereto. near its upper edge is a cross piece S. made of board about 1 foot or 15 inches wide perforated with holes and placed edge up so as to divide the tub in the centre —. 3. A supply tub or vessel C elevated above the boiler for the purpose of supplying cold water to the boiler — A Scalding Tub B. as herein after described — 4th from the top of the boiler a steam tube D is brought along the surface of the pavement and passing over the edge of the tub B is carried down close along its side to within an inch or two of the bottom where it makes a rectangular bend which brings its open end into the centre of the tub — it is furnished with a stop cock, a. at the upper edge of the tub to shut off or admit the steam — 5th a similar tube E. is brought from the supply tub and passes along the pavement and down into the tub B close to the steam pipe D. so that the same wooden case may cover & protect them both it is also furnished with a cock b. to shut off or admit the water as needed. 6th The supply tub also has another tube F. with a stop cock c. through which the boiler is replenished with water by simply turning said cock.

Operation. The boiler and supply tub c, being filled with water; as also the tub B through the supply pipe E. the fire is to be kept under the boiler at a point sufficient to generate low pressure steam for high pressure or steam highly rarified, I have found by my experience, has not the desired effects producing what I term a hard scald. the steam cock. a, being turned the water in the tub B, becomes heated, and after sufficiently hot the cock. a, is closed: the hogs one at a time are then introduced on one side of the cross piece, S, and being pressed down with a pole, for that purpose, so as to pass under said cross piece, are taken out on the other side, ready for scraping, the time of immersion necessary being only sufficient to perform the manual operation just described of passing them under the cross piece. Should the water in the tub become too hot the stop cock D is turned and a sufficient quantity of cold water admitted, also the waste is to be supplied from the same source thus the temperature of the water is placed completely under the controul of the operator to any degree of exactness and that without loss of time —

Now I do not claim the boiler; nor the use of steam for heating water but what I do claim as new and as my invention for which I ask letters Patent is the introduction of a steam and a water pipe, into the scalding tub used in connection with an ordinary boiler for generating steam for the purposes and in the manner herein set forth and described — .

In testimony that the foregoing is a true Specification of my said invention — I have hereunto set my hand this first day of January 1835.

Witnesses

Saml. Stittinius

John Buddy

Thomas I. Godman (Drawing.)